(12) United States Patent
Spears et al.

(10) Patent No.: US 11,602,132 B2
(45) Date of Patent: Mar. 14, 2023

(54) SYSTEM AND METHOD OF COUNTING LIVESTOCK

(71) Applicant: Sixgill, LLC, Santa Monica, CA (US)

(72) Inventors: Logan Spears, Kingston, WA (US); Carlos Anchia, Plano, TX (US); Corey Staten, Columbus, OH (US); Wei Xu, Seattle, WA (US)

(73) Assignee: Sixgill, LLC, Santa Monica, CA (US)

( * ) Notice: Subject to any disclaimer, the term of this patent is extended or adjusted under 35 U.S.C. 154(b) by 347 days.

(21) Appl. No.: 17/064,463

(22) Filed: Oct. 6, 2020

(65) Prior Publication Data

US 2022/0104463 A1    Apr. 7, 2022

(51) Int. Cl.
| | |
|---|---|
| *A01K 29/00* | (2006.01) |
| *G06N 3/02* | (2006.01) |
| *G01S 17/89* | (2020.01) |
| *G06T 7/11* | (2017.01) |
| *G06V 10/20* | (2022.01) |
| *G06V 20/40* | (2022.01) |

(Continued)

(52) U.S. Cl.
CPC ............ *A01K 29/005* (2013.01); *G01S 17/89* (2013.01); *G06F 18/24* (2023.01); *G06N 3/02* (2013.01); *G06T 7/11* (2017.01); *G06V 10/255* (2022.01); *G06V 20/49* (2022.01); *G06V 40/10* (2022.01); *G06T 2207/10016* (2013.01); *G06T 2207/20084* (2013.01); *G06T 2207/30242* (2013.01)

(58) Field of Classification Search
None
See application file for complete search history.

(56) References Cited

U.S. PATENT DOCUMENTS

| | | |
|---|---|---|
| 2007/0288249 A1 | 12/2007 | Rowe et al. |
| 2017/0365083 A1 | 12/2017 | Hartrell et al. |

(Continued)

FOREIGN PATENT DOCUMENTS

| | | |
|---|---|---|
| CN | 3116419 | 4/2020 |
| WO | 2020077438 | 4/2020 |
| WO | 2020125057 A1 | 6/2020 |

OTHER PUBLICATIONS

U.S. Appl. No. 62/746,790 entitled "Counting Livestock" filed Oct. 17, 2018.

(Continued)

*Primary Examiner* — Leon Viet Q Nguyen
(74) *Attorney, Agent, or Firm* — Ahmann Kloke LLP

(57) ABSTRACT

A system configured to receive video and/or images from an image capture device over a livestock path, generate feature maps from an image of the video by applying at least a first convolutional neural network, slide a window across the feature maps to obtain a plurality of anchor shapes, determine if each anchor shape contains an object to generate a plurality of regions of interest, each of the plurality of regions of interest being a non-rectangular, polygonal shape, extract feature maps from each region of interest, classify objects in each region of interest, in parallel with classification, predict segmentation masks on at least a subset of the regions of interest in a pixel-to-pixel manner, identify individual animals within the objects based on classifications and the segmentation masks, and count individual animals based on identification, and provide the count to a digital device for display, processing, and/or reporting.

21 Claims, 13 Drawing Sheets

(51) Int. Cl.
    *G06V 40/10*     (2022.01)
    *G06F 18/24*     (2023.01)

(56) References Cited

U.S. PATENT DOCUMENTS

| | | | |
|---|---|---|---|
| 2020/0120899 A1 | 4/2020 | Labrecque | |
| 2020/0120900 A1 | 4/2020 | Labrecque | |
| 2020/0125849 A1* | 4/2020 | Labrecque | A01K 1/0218 |
| 2020/0410669 A1* | 12/2020 | Psota | G06V 40/103 |
| 2021/0153479 A1* | 5/2021 | Mindel | G06V 10/56 |

OTHER PUBLICATIONS

U.S. Appl. No. 62/748,774 entitled "Monitoring Livestock Behavior" filed Oct. 22, 2018.
U.S. Appl. No. 62/848,942 entitled "Monitoring Livestock" filed May 16, 2019.
International Application No. PCT/US2021/053610, International Search Report and Written Opinion dated Jan. 14, 2022.

* cited by examiner

Video

Polygon-based approach

Before Clustering

After Clustering

SYSTEM AND METHOD OF COUNTING LIVESTOCK

FIELD OF THE INVENTION

Embodiments of the present inventions related generally to counting and providing an inventory of count of a number of livestock.

BACKGROUND

As the average number of livestock, such as cattle, pigs, and sheep kept by farmers have increased, determining an accurate count of livestock is a vital part of livestock raising and animal husbandry. Existing systems of keeping track of livestock include physically tagging livestock for identification purposes. Such systems often require tags or sensors to be intrusively attached to livestock. Examples of this includes tagging cattle with bar codes or radio-frequency identification (RFID) tags. Such intrusive systems may cause livestock unnecessary stress and are unreliable because tags can be damaged or fall off. Other non-invasive methods of counting livestock may include performing a manual count on a small sample of livestock and extrapolating the result to an entire herd of livestock.

SUMMARY

An example system comprises at least one processor and memory, the memory containing instructions to control any number of the at least one processor to: receive video from an image capture device, the image capture device being positioned over a livestock path, the video containing images of livestock walking along the livestock path, the image capture device including any number of cameras, select an image from the video, generate feature maps from the image by applying at least a first convolutional neural network, slide a first window across the feature maps to obtain a plurality of anchor shapes using a region proposal network, determine if each anchor shape of the plurality of anchor shapes contains an object to generate a plurality of regions of interest, each of the plurality of regions of interest being a non-rectangular, polygonal shape, extract feature maps from each region of interest, classify objects in each region of interest, in parallel with classification, predict segmentation masks on at least a subset of the plurality of regions of interest in a pixel-to-pixel manner, identify individual animals within the objects based on classifications and the segmentation masks, and count individual animals based on the identification; and provide the count to a digital device for display.

In some embodiments, extracting the feature maps from the regions of interest comprises performing RoIAlign to extract the feature maps from each region of interest, RoIAlign utilizing binary interpolation to preserve spatial information which would otherwise get misaligned if RoI pool was applied. Each anchor shape may be a non-rectangular, polygonal shape. In various embodiments, the classification does not depend upon segmentation masks. Each segmentation mask may encode an associated object's spatial layout.

The image capture device may comprise a LiDAR device. In some embodiments, the feature maps are generated from image information of the image and depth information from the LiDAR device.

In some embodiments, the system receives multiple images of a herd of the livestock as the herd of the livestock travels the livestock path, the memory containing instructions to count at least a subset of the animals of the herd using the multiple images and generate a total of the counted animals. The memory containing instructions to provide the count to the digital device for displays may comprise the memory containing instructions to provide the total of the counted animals. Counting may occur in real time as the livestock walks along the livestock path.

An example non-transitive computer readable medium may comprise instructions to a control at least one processor to perform a method. The method may comprise receiving video from an image capture device, the image capture device being positioned over a livestock path, the video containing images of livestock walking along the livestock path, the image capture device including any number of cameras, selecting an image from the video, generating feature maps from the image by applying at least a first convolutional neural network, sliding a first window across the feature maps to obtain a plurality of anchor shapes using a region proposal network, determining if each anchor shape of the plurality of anchor shapes contains an object to generate a plurality of regions of interest, each of the plurality of regions of interest being a non-rectangular, polygonal shape, extracting feature maps from each region of interest, classifying objects in each region of interest, in parallel with classification, predicting segmentation masks on at least a subset of the plurality of regions of interest in a pixel-to-pixel manner, identifying individual animals within the objects based on classifications and the segmentation masks, counting individual animals based on the identification, and providing the count to a digital device for display.

An example method may comprise receiving video from an image capture device, the image capture device being positioned over a livestock path, the video containing images of livestock walking along the livestock path, the image capture device including any number of cameras, selecting an image from the video, generating feature maps from the image by applying at least a first convolutional neural network, sliding a first window across the feature maps to obtain a plurality of anchor shapes using a region proposal network, determining if each anchor shape of the plurality of anchor shapes contains an object to generate a plurality of regions of interest, each of the plurality of regions of interest being a non-rectangular, polygonal shape, extracting feature maps from each region of interest, classifying objects in each region of interest, in parallel with classification, predicting segmentation masks on at least a subset of the plurality of regions of interest in a pixel-to-pixel manner, identifying individual animals within the objects based on classifications and the segmentation masks, counting individual animals based on the identification, and providing the count to a digital device for display.

DETAILED DESCRIPTION

Various embodiments described herein include a system for counting livestock. The system may utilize one or more image capture devices mounted above a path used by livestock (e.g., a cattle chute) and a livestock tracking system that utilizes artificial intelligence (AI). The image capture device may take images of livestock as they cross a livestock path. The livestock tracking system may process the digital video or images to identify and track each animal as it moves across the field of view of the image capture device, even if one or more animals should double back from the livestock chute. The system may provide a count corresponding to the number of livestock that passes across the livestock path. In some embodiments, the system may store the feed and/or processing steps as well (e.g., using segmentation masks or non-rectangular, polygon shapes of the animals). The centralized system may provide this information in a user interface.

The system may be turned on and off based on one or more trigger conditions. A trigger condition may be, for example, a manual control or an opening or closing of a gate.

The livestock tracking system may utilize instance segmentation to recognize livestock for accurate counting. Instance segmentation, in one example, identifies boundaries of objects at the pixel level. Where semantic segmentation may identify each cluster of segments as belonging to a class of objects, instance segmentation may identify each cluster of segments as belonging to a different object of the same class.

Figure 1:
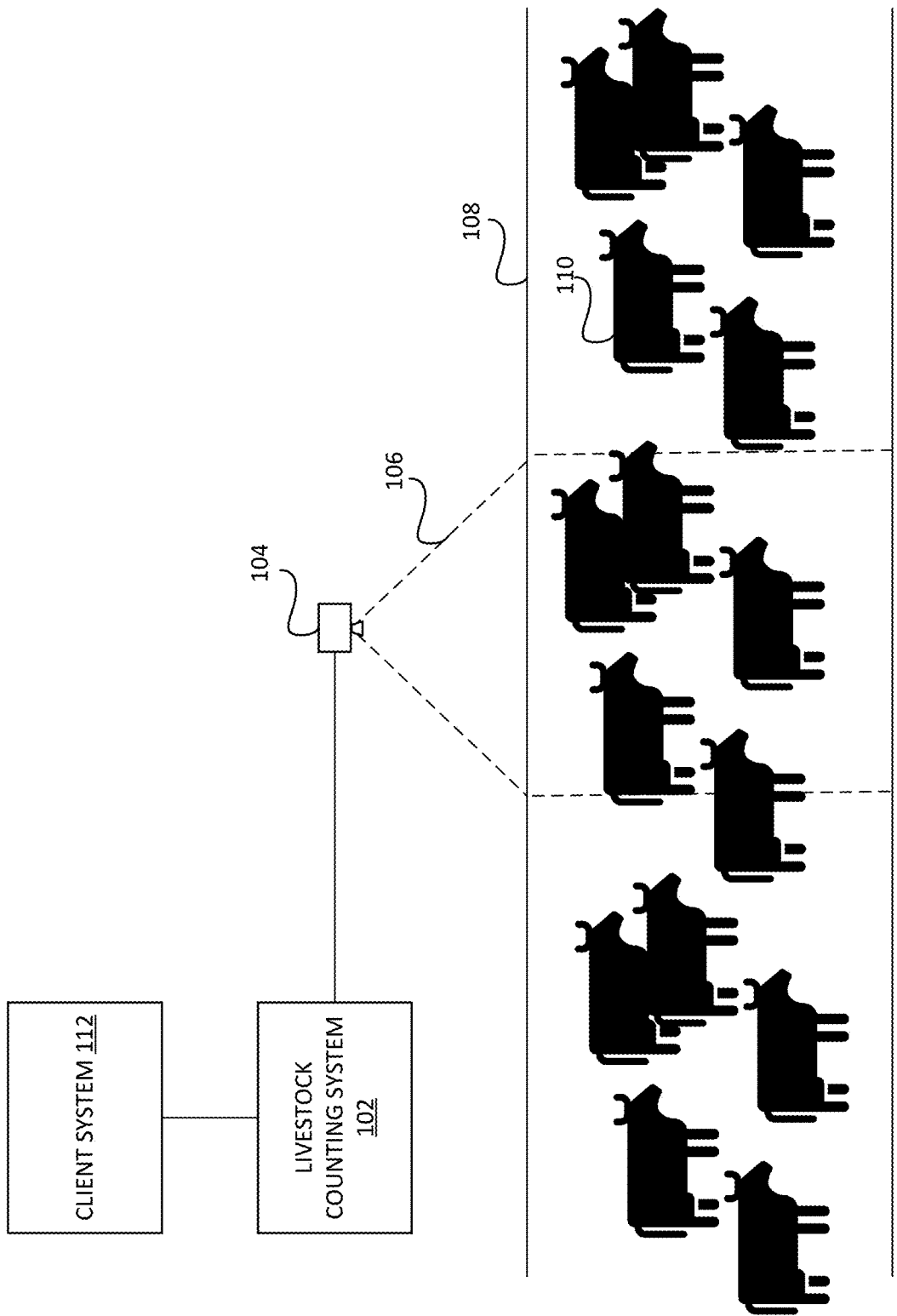
FIG. 1 depicts a block diagram of an example environment capable of counting and inventorying livestock according to some embodiments.

FIG. 1 depicts a block diagram of an example environment 100 capable of counting and inventorying livestock according to some embodiments. The example environment includes a livestock tracking system 102, an image capture device 104 with a field of view 106, a livestock path 108, livestock 110, and a client system 112.

The image capture device 104 may be any capture device, including, for example, a camera. In various embodiments, the image capture device 104 may be positioned over the livestock path 108. In some embodiments, the image capture device 104 may be or include any number of cameras capable of taking images or video as the livestock path over the livestock path 108. In some embodiments, the image capture device 104 is positioned 8-10 feet overhead of the ground of the livestock path 108. It will be appreciated that the image capture device 104 may be positioned at any position over the livestock path 108. In different embodiments, the image capture device 104 may be positioned in front of the livestock, below the livestock, from behind the livestock, at any angle, or the like.

Placing the image capture device 104 overhead of the livestock path 108 may greatly reduces or eliminate overlaps of livestock in images. This simplifies the process of instance segmentation (e.g., for counting individual animals).

The image capture device 104 may provide images or video to the livestock tracking system 102. In some embodiments, the image capture device 104 utilizes the Real Time Streaming Protocol (RTSP).

There may be any number of image capture device 104. In one example, there is a single image capture device 104. In some embodiments, the image capture device 104 may include or be paired with a LiDAR or other depth sensing device. In one example, the image capture device 104 and the LiDAR may provide images and depth data to the livestock tracking system 102. Information from the images and depth data may be assessed and/or used as features in the convolution performed by the livestock tracking system 102.

In some embodiments, the LiDAR may be utilized to reduce or eliminate the risk of counting a box (e.g., bounding box or non-rectangular, polygonal shape) or segmentation mask as a single animal when, in reality, there may be multiple animals close together (e.g., thereby enabling the system to identify multiple animals and/or draw non-rectangular, polygonal shapes around each animal even if close together). The information from the LiDAR may be used in conjunction with the image capture device 104 to detect multiple animals that are close together as separate animals. Models may be trained using features from the combination of image features and features of the depth information. The models may subsequently be used to assist with object detection, classification, and/or regression based on images received from the image capture device 104 and LiDAR.

The information from the LiDAR may be used in conjunction with the image capture device 104 to reduce or eliminate long shadows (e.g., at dusk or dawn), fog, snow, and/or unforeseen conditions influencing creation or changes of bounding boxes/non-rectangular, polygonal shapes or otherwise obscuring animals in the image for identification.

In some embodiments, the use of LiDAR in conjunction with the image capture device 104 may assist to eliminate or reduce the need to take multiple images of livestock as it crosses the livestock path. In some embodiments, the image capture device 104 may take multiple images of livestock as the animals cross the livestock path 108 to track each individual animal and to track if there are multiple animals bunched together that may inadvertently be counted as a single animal.

The image capture device 104 may have any field of view 106. In various embodiments, the livestock tracking system 102 may receive video and perform assessments of livestock that are captured on video by the image capture device 104 in the field of view 106. It will be appreciated that there may be any number of image capture devices 104 with any number of fields of view 106 that may overlap or extend the view. In some embodiments, the image capture device 104 may include or be local to one or more overhead light sources to illuminate the livestock as the livestock travel the livestock path 108.

The livestock path 108 is any path under or in a field of view of at least one age capture device 104 and that allows livestock to travel from one place to another. In one example described herein, the livestock may be cattle and the livestock path 108 may be immediately in front of a chute or any other path. In some embodiments, the livestock path may be along a path that livestock travel before or after weight measurement (e.g., before or after a scale).

Livestock 110 may include any number and type of animals. Many examples described herein will focus on cattle and pigs as examples of livestock for counting. It will be appreciated that these are examples, and that systems or methods described herein may be used for many different types of livestock such as sheep, goats, chickens, turkeys, or the like. Further, while a single type of livestock is being counted in these examples (e.g., cattle are counted as they travel over a livestock path), it will be appreciated that mixed animals may also be separately counted (e.g., sheep and dogs). In one example, different genders of animals may be separately counted (e.g., cows may be counted separately from bulls).

In further examples, animals of a specific quality may be separately counted. For example, cows that appear wounded or ill may be identified from the images and counted separately from otherwise healthy animals. Similarly, cows that appear pregnant or ready for market may be detected from the images and counted separately. By using instance segmentation, each animal may be identified from an image and separately assessed. In another example, the livestock tracking system 102 may track a total of all animals of a particular type (e.g., cattle) as well as subtotals of animals of a certain quality (e.g., separate counts of cows, bulls, pregnant cows, and unhealthy cows)

The livestock tracking system 102 receives the images and/or stream from the image capture device 104. In various embodiments, the livestock tracking system 102 utilizes one or more models from region-based convolution neural networks for livestock identification and counting.

In various embodiments, the livestock tracking system 102 selects images received from the image capture device 104 (e.g., from video), and locates each pixel of every object in the image for instance segmentation (e.g., using Mask R-CNN or any R-CNN process). For each image, the livestock tracking system 102 may create region proposals, classify the region proposals, and generate segmentation masks to identify specific animals for counting. The livestock tracking system 102 may provide the count to the client system 112.

Figure 13:
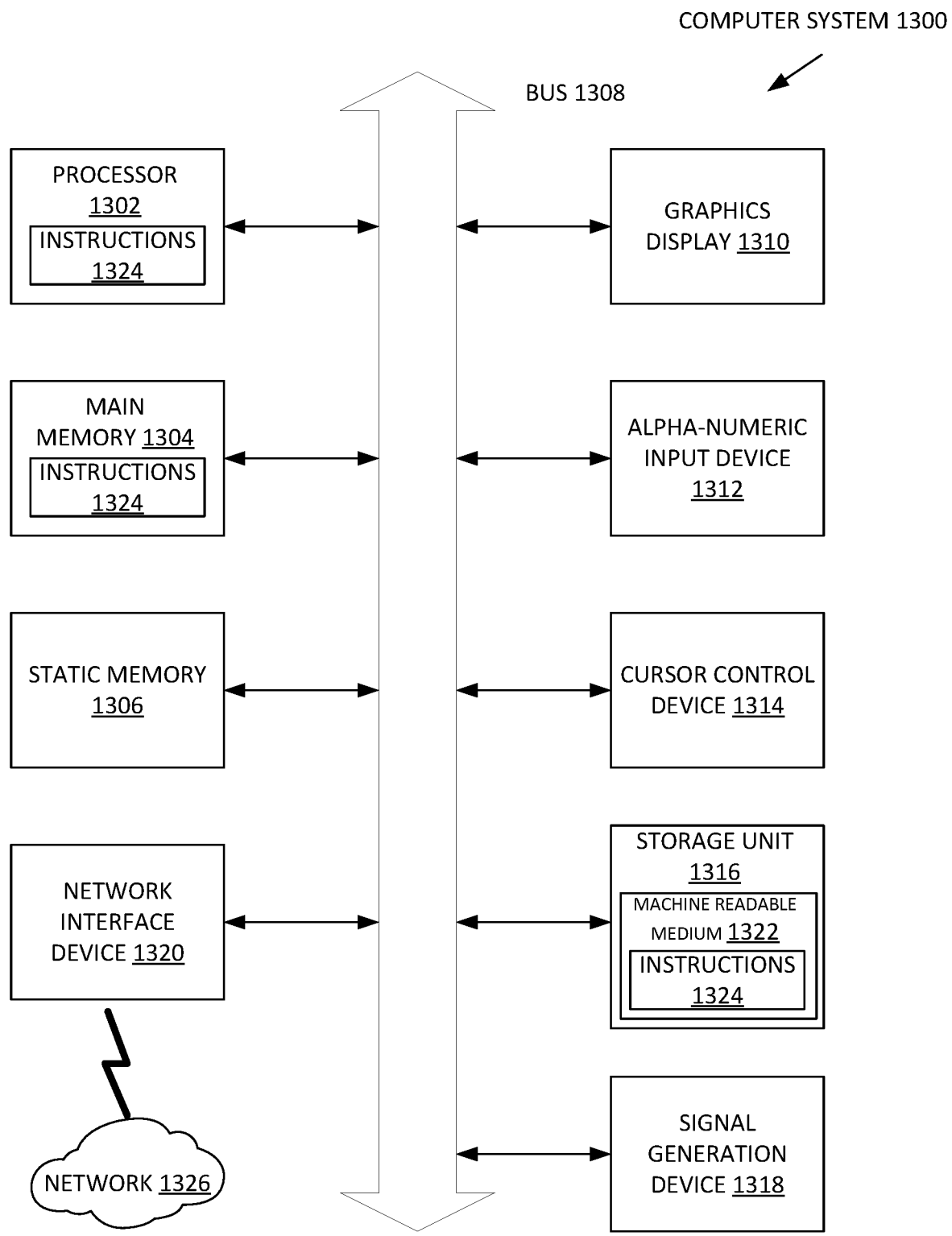
FIG. 13 depicts a block diagram of an example computing device according to some embodiments.

The livestock tracking system 102 and the client system 112 may be digital devices or collections of digital devices. A digital device is any device with at least one processor and memory. Example digital devices include a computer such as a laptop, personal computer, server, terminal, media tablet, smart watch, smart phone, and/or the like. An example of a digital device is depicted in FIG. 13.

The client system 112 may be any digital device controlled by a user for assessing and/or receiving a count of livestock 110 that passes over the livestock path 108. In various embodiments, the client system 112 may communicate directly with the livestock tracking system 102 or over a communication network. In some embodiments, the client system 112 may communicate with a control system over a communication network to receive or view a count (e.g., the livestock tracking system 102 may be in communication with the control system over the network as well). The control system may be a digital device or collection of digital devices.

The control system may receive information (e.g., images, video, processing, features, counts, or the like) from the livestock tracking system 102 to assist in providing or calculating a livestock count for the client system 112. In various embodiments, the control system may provide updates (e.g., new models and/or processing approaches) to any number of remote livestock tracking systems 102 (e.g., the control system may provide support and updating services to any number of remote livestock tracking systems 102 providing counts to any number of different livestock for any number of clients). In some embodiments, a user (e.g., a client) may contact the control system or the livestock tracking system 102 by navigating to a webpage that retrieves or receives the livestock count from the control system and/or the livestock tracking system 102.

The livestock tracking system 102 may identify region proposals in an image, classify the proposals, and generate bounding boxes or non-rectangular, polygonal shapes using a convolutional neural network. The livestock tracking system 102 may utilize a backbone network (e.g., a standard CNN). Earlier layers may detect low-level features while later features detect high-level features. A Feature Pyramid Network (FPN) is an extension of the backbone network which may represent objects at multiple scales. The FPN may include two pyramids where the second pyramid receives the high-level features from the first pyramid and passes them to the lower layers. This allows every level to have access to both lower and higher-level features.

The livestock tracking system 102 may utilize a Region Proposal Network (RPN) to scan the FPNs and propose regions which may contain objects. The livestock tracking system 102 may utilize a set of boxes or non-rectangular, polygonal shapes (e.g., anchors) with defined locations and scales according to the input images. Individual sets of boxes or non-rectangular, polygonal shapes may be assigned classes. The RPN, in this example, may generate two outputs for each set of boxes or non-rectangular, polygonal shapes, including, for example, anchor class and bounding box/non-rectangular, polygonal shapes specifications. The anchor class may be either a foreground class or a background class.

The livestock tracking system 102 may utilize RoIAlign for convolutions in which a feature map is sampled at different points and then a bilinear interpolation is applied to get a precise idea of what would be at each pixel.

The livestock tracking system 102 then may utilize a convolutional network to take the regions selected by the ROI classifier (e.g., any number of support vector machines (SVMs)) and generate segmentation masks.

The classifier may be any number of support vector machines (SVMs). The SVM may differentiate any number of classes using support vectors. In one example, SVMs may be trained on multivariate data and may project input data into a higher dimensional reference space (e.g., a reference space with more dimensions than that of the received data). The SVMs may be trained to identify extremes of class differentiation and utilize linear vectors within the high-dimensional reference space to differentiate classes and images. In some embodiments, parameters may be projected using a kernel function that is trained using k-fold cross-validation.

In some embodiments, the livestock tracking system 102 may utilize a linear regression once an object has been classified to generate tighter binding box coordinates.

Figure 2:
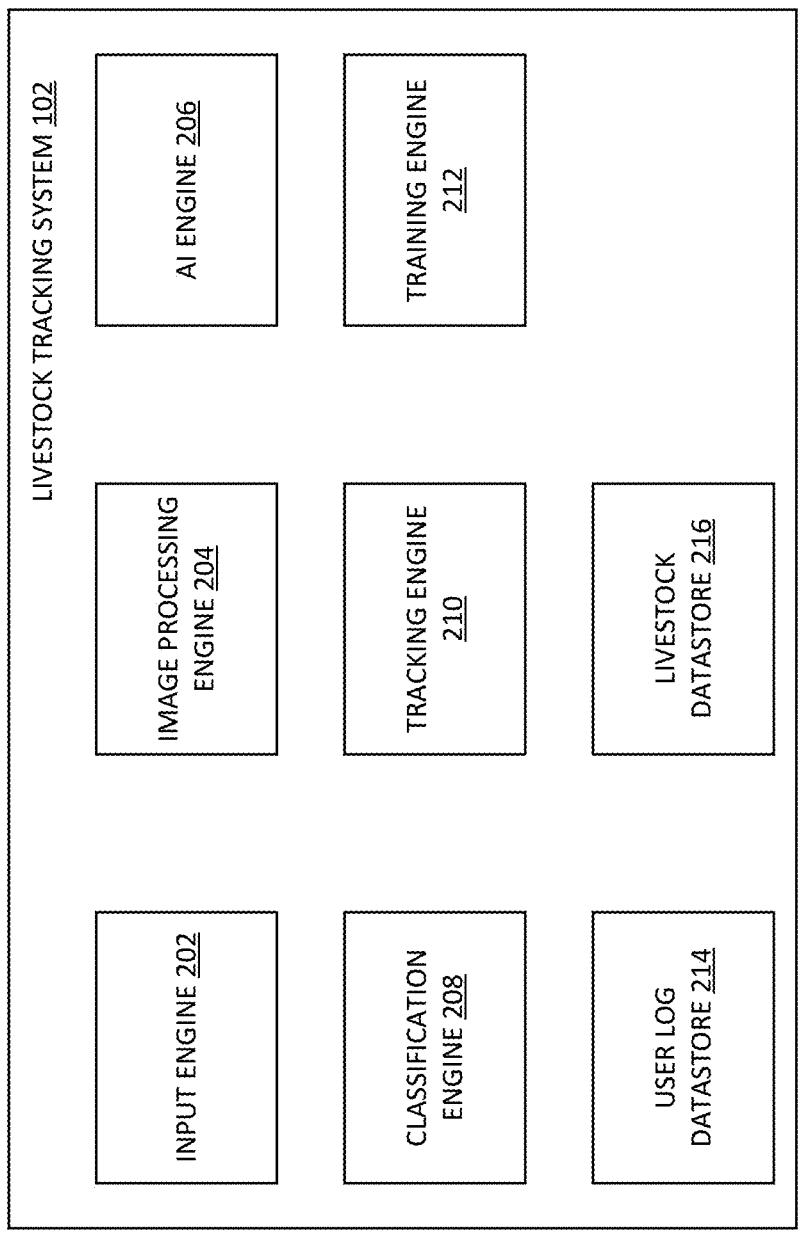
FIG. 2 depicts a block diagram of an example livestock tracking system according to some embodiments.

FIG. 2 depicts a block diagram of an example livestock tracking system 102 according to some embodiments. As discussed herein, the livestock tracking system 102 may include any number of digital devices. In one example, the livestock tracking system 102 includes at least one processor, a GPU (e.g., Nvidia 2080), memory, and communication interface configured to receive images and/or streams from the image capture device 104.

The livestock tracking system 102 includes an input engine 202, an image processing engine 204, an artificial intelligence (AI) engine 206, a classification engine 208, a user log datastore 214, and a livestock datastore 216. The livestock tracking system 102 and the client system 112 may each be or include any number of digital devices. A digital device is any device with a processor and memory. Digital devices are further discussed herein (e.g., see FIG. 13).

The input engine 202 may be configured to receive and decode video received from the image capture device 104. In various embodiments, the input engine 202 takes images or slices of the video for further processing. The input engine 202 may select any number of the images (e.g., periodically select images) for processing by the image processing engine 204.

In various embodiments, the image processing engine 204 may receive the image from the input engine 202. The image processing engine 204 may assess the image to identify objects and/or regions of interest (RoI) using a region proposal network (RPN) and score potential bounding boxes or non-rectangular, polygonal shapes (e.g., using a cls layer for scores and a reg layer for coordinates). The AI engine 206 may classify objects within the bounding boxes or non-rectangular, polygonal shapes using any number of SVMs. The AI engine 206 may create segmentation masks and/or identify different livestock associated with the different segmentation masks. Subsequently, the animals may be counted.

In some embodiments, the livestock tracking system 102 tracks animals across multiple images as the animals travel the livestock path 108 before concluding the animal count (e.g., to prevent a single animal being counted when the segmentation mask contains multiple animals in the image).

The AI engine 206 may apply any number of models to assist in proposing regions of interest, scoring RoIs, object classification, creating segmentation masks, and/or identifying different livestock within the image. For example, the AI engine 206 may utilize models to create segmentation masks associated with qualifying regions of interest (using a CNN).

In some embodiments, the AI engine 206 may utilize models to create segmentation masks (e.g., associated with boxes or non-rectangular, polygonal shapes) within an image as individual livestock. The AI engine 206 may also use segmentation mask criteria to assist in limiting the objects of interest in the image. The segmentation mask criteria may identify characteristics of an RoI, bounding box, or non-rectangular, polygonal shape that are required to be satisfied in order for the object to be livestock to be counted. The segmentation mask criteria may include, for example, a range of sizes. In another example, the segmentation mask criteria may include a range of shapes. The method is further discussed herein.

The AI engine 206 may utilize models to create segmentation masks, to label or categorize objects in regions as livestock, or both.

The classification engine 208 may be configured to identify livestock associated with segmentation masks. The classification engine 208 may utilize models to identify livestock associated with the segmentation mask. The classification engine 28 may be configured to identify the objects that also satisfy the segmentation mask criteria. In various embodiments, the classification engine 208 identifies each object within different RoIs and/or segmentation masks as different animals.

The tracking engine 210 may count livestock based on the animal identification by the classification engine 208. The tracking engine 210 may also track the same animal in multiple images as the animal travels across the image capture device 104 field-of-view (e.g., as the animal crosses the livestock path 108). If animals overlap or are too close together, the tracking engine 210 may track the animals across the livestock path 108 in order to determine if the animals spread apart (e.g., thereby creating multiple segmentation masks for different animals as the animals travel down the livestock path 108). The tracking engine 210 may then count the animals in the image(s).

For example, two more cows may be bunched closely together as they emerge onto the livestock path 108. The initial image from the image capture device 104 may capture the cows being very close together. The image processing engine 204 may create a segmentation mask or enclosed shape that surrounds two or more cows. The AI engine 206 or the classification engine 208 may not recognize the segmentation mask as being an animal or may indicate that the segmentation mask is a single animal. The livestock tracking system 102 may receive any number of images as the same cows travel along the livestock path 108 within the field-of-view 106. As a result, the tracking engine 210 may utilize multiple images of the same animals to assist in identifying individual cows as they move and spread apart from each other. As such, the tracking engine 210 may identify a larger, single non-rectangular, polygonal shape surrounding two or more animals in an earlier image and then identify multiple cows as they travel down the livestock path 108 in later images.

It may be appreciated that classification of a single type of animal, such as cows, simplifies the categorization process because there are not a large number of different classes that may apply.

The training engine 212 may utilize at least a portion of a training set of images and/or segmentation masks to train the AI modeling system to assist in identifying regions of interest within the image as being livestock for creating segmentation masks and/or categorize segmentation masks (e.g., non-rectangular, polygonal boxes) as livestock. The training engagement may utilize another portion of the training set to test to results of the AI modeling system.

The training engine 212 may utilize hyperlabel to create a training set. The training set may be used to train a network such as the extractor (of regions), classifier, and the regressor for improved fitting of bounding boxes/non-rectangular, polygonal shapes to objects. Hyperlabel is an application that enables users to draw shapes (e.g., non-rectangular, polygonal shapes or rectangular boxes) and/or label the shapes (e.g., categorize) in an image. For example, users may draw shapes (e.g., non-rectangular, polygonal shapes) around livestock and/or label non-rectangular, polygonal shapes of an image as being livestock.

Figure 10:
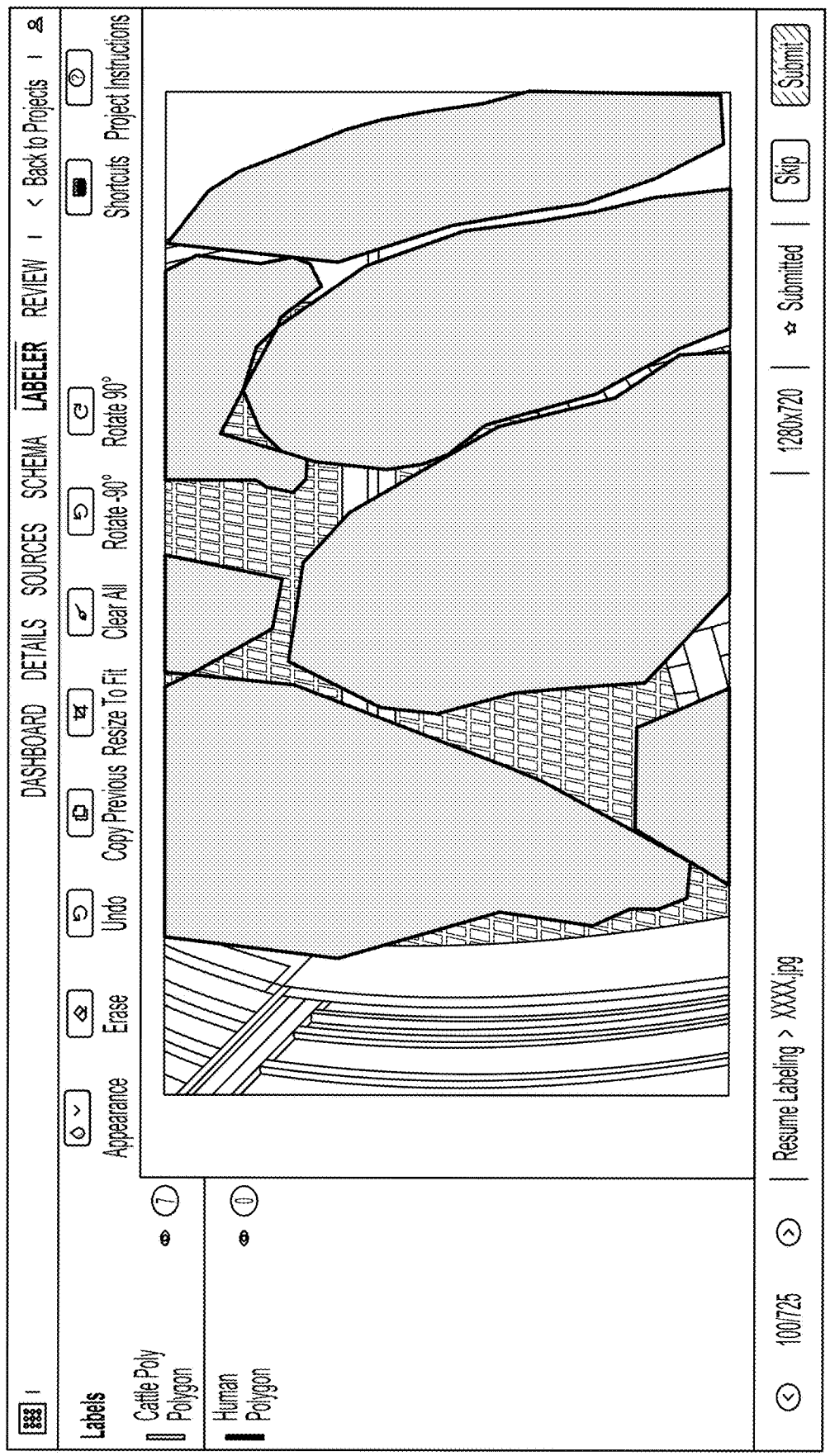
FIG. 10 depicts an example user interface of hyperlabel that may be used to assist in training by enabling trainers to draw segmentation masks and/or otherwise identify livestock in images according to some embodiments.

In some embodiments, livestock may travel over the livestock path 108 and the image capture device 104 may provide a stream of video to the input engine 202. The input engine 202 may decode the stream and take slices of video at predetermined intervals. The image processing engine 204 may identify regions of interest and the AI engine 206 may utilize non-rectangular, polygonal shapes or bounding boxes. The non-rectangular, polygonal shapes within the images may be identified as specific livestock (e.g., a first cow, and another non-rectangular, polygon as being a second cow, and so forth). The identification may be performed manually (e.g., via hyperlabel) to create a training set for model creation. FIG. 10 depicts an example user interface of hyperlabel that may be used to assist in training by enabling trainers to draw segmentation masks and/or otherwise identify livestock in images according to some embodiments.

The training set may be used to train the AI system. A loss function may be the combination of the class and intersection-over union of the guess of the IAI engine 206. The loss function may utilize a gradient descent.

In some embodiments, the AI engine 206 may be capable of tracking animals even in close quarters. For example, in some images, two livestock (e.g., two cows) may be close together. The AI engine 206 may initially create a non-rectangular, polygonal shapes that captures both animals. FIG. 7B depicts animals in one example that are close together that might otherwise be bound together within the non-rectangular, polygonal box. By training the model, the AI engine 206 may create non-rectangular, polygonal shapes around each animal separately or disregard an irregularly shaped non-rectangular, polygonal shape that does not match or fit within a segmentation mask criteria.

Further, in some embodiments, the AI engine 206 may receive additional images from the image capture device 104 and detect when the animals separate along the livestock path. The AI engine 206 may generate two non-rectangular, polygonal shapes, one for each animal, and track the animals. As a result, through the segmentation mask criteria and/or taking multiple images along a livestock path, animals may be identified and counted.

The segmentation mask criteria may include any kind of criteria that assists in the identification of a shape as being a particular animal. In some embodiments, the livestock tracking system 102 may be configured to track cows as they emerge from a cow chute. The image capture device 104 may be positioned over the livestock path. The segmentation mask criteria may include criteria that fit an expected non-rectangular, polygonal shape for the size and general shape of a cow. If the livestock are all the same animal of the same age range, the segmentation mask criteria can define non-rectangular, polygonal shapes of expected sizes and shapes. If a non-rectangular, polygonal shape of an object in an image does not fit the segmentation mask criteria, the livestock tracking system 102 may flag the object in future images to determine if the non-rectangular, polygonal shape in the image changes (e.g., separates to any number of non-rectangular, polygonal shapes that fit the segmentation mask criteria). If a dog or person walks across the livestock path for example, the livestock tracking system 102 may not count the image of the dog or person because their shapes do not fit the segmentation mask criteria.

In some embodiments, the AI engine 206 may identify regions of interest of an image based on one or more models. The region of interest (RoI) may include qualities that make it a proposed region of interest based on qualities that satisfy a selection criteria, score, segmentation mask criteria and/or any number of models. The AI engine 206 may identify regions using non-rectangular, polygonal shapes and/or draw non-rectangular, polygonal shapes around qualifying proposed regions of interest based on the selection criteria, score, segmentation mask criteria and/or any number of models. Similarly, in some embodiments, the AI engine 206 may categorize or otherwise label objects in or associated with RoIs as livestock based on any criteria including or not including the segmentation mask criteria and/or any number of models.

In one embodiment, the user log datastore 214 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and/or the like). The user log datastore 214 may store authentication information and user information regarding different users who interact with the livestock tracking system 102 or access livestock counts. The user log data store 214 may also track what information is provided to each user at what time (e.g., video, animal counts, location information, conditions, and/or the like).

In various embodiments, the livestock datastore 216 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and/or the like). The livestock datastore 216 may store stream from the image capture device 104 and/or the selected images used for processing by the image processing engine 204. The livestock datastore 216 may also store the segmentation masks/non-rectangular, polygonal shapes identified in different images and track which shapes are associated with different animals. The livestock datastore 216 may track the stream, images, processed images, counts, and the like for any number of different livestock counting events from any number of image capture devices 104 over any number of different livestock paths.

It will be appreciated that utilizing the livestock tracking system 102 as discussed herein may greatly reduce errors in manually counting. Further, counting may be performed without distractions and recounts, if any, do not need to be manual. Rather, in some embodiments, video can be reviewed to confirm livestock counts and AI effectiveness when pre-count and automated counts do not match. Further, employees (e.g., livestock handlers and drivers) may stay warm as the need to go outside decreases.

Figure 3:
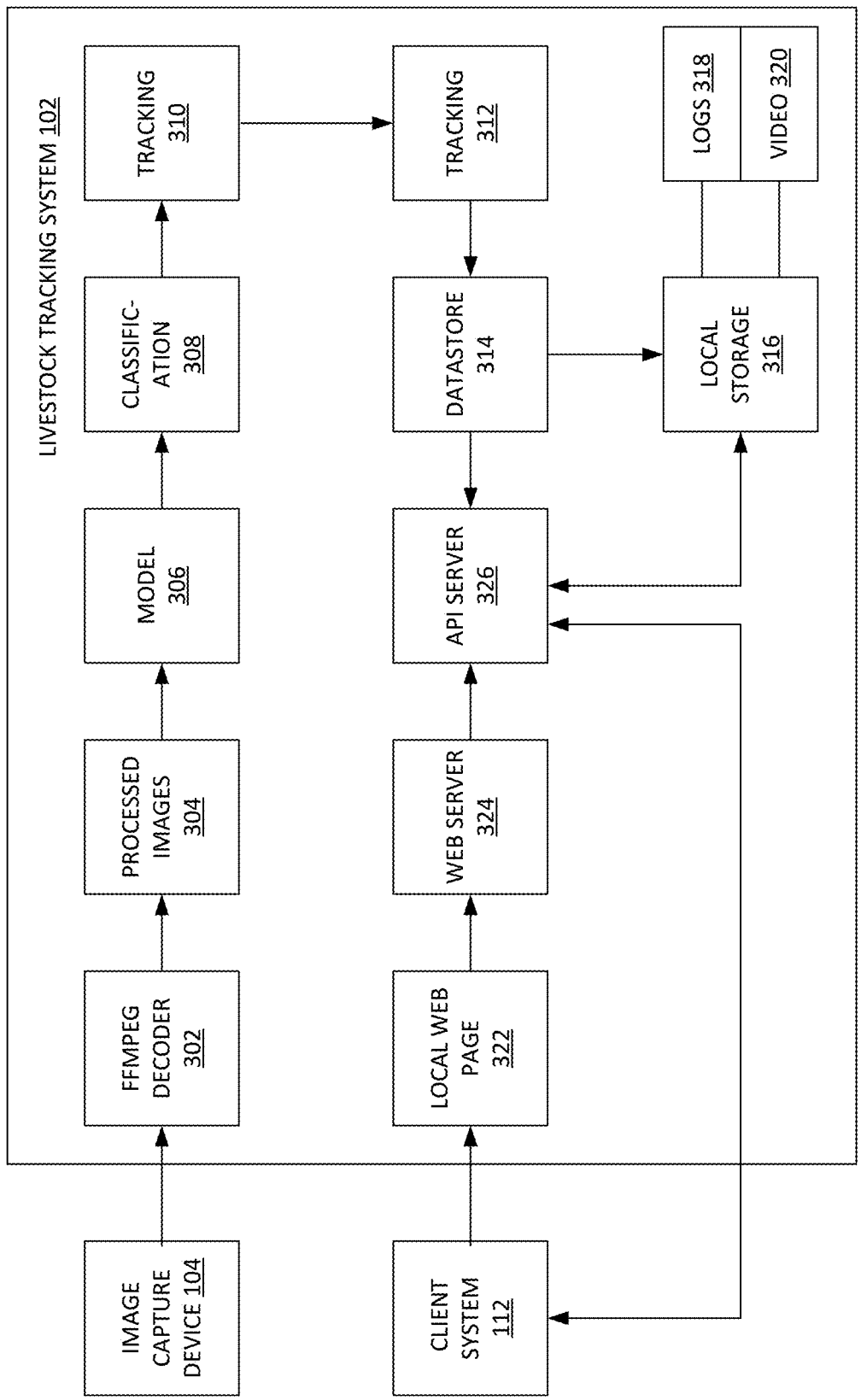
FIG. 3 depicts a process for tracking livestock in some embodiments.

FIG. 3 depicts a process for tracking livestock in some embodiments. In the example of FIG. 3, the image capture device 104 provides images to the livestock tracking system 102. The livestock tracking system 102 may provide livestock counts to the client system 112.

Figure 5:
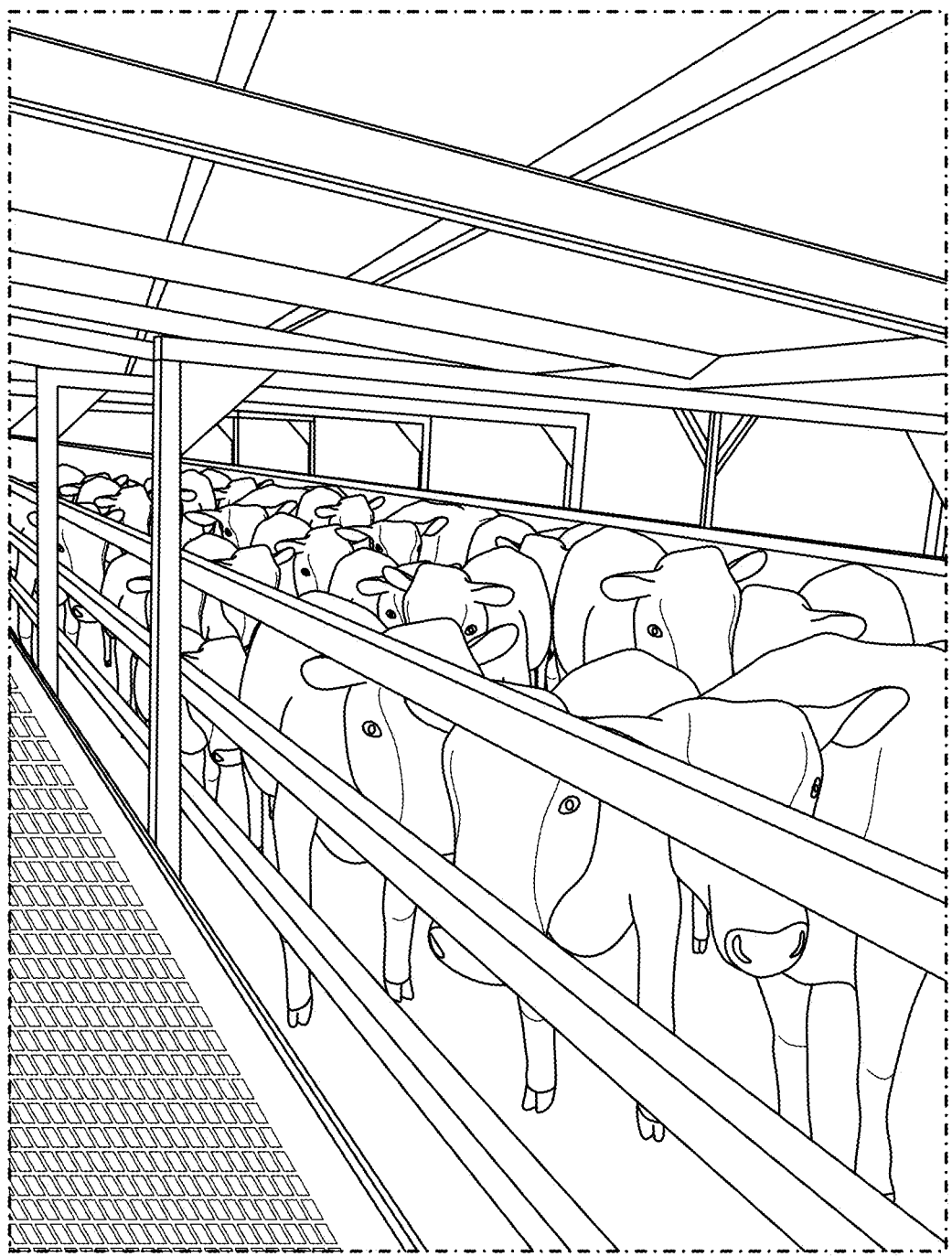
FIG. 5 depict cattle on a livestock path in some embodiments.

In one example, a truck carrying livestock may deliver livestock to a facility. Once a total weight is provided (e.g., using a scale), the cattle may enter the livestock path. FIG. 5 depicts cattle approaching a livestock path in some embodiments. Counting of the livestock may occur as the livestock walk from the scale. In the prior art, there may be video while staff (i.e., people) manually count the animals. If there is a discrepancy, the staff may replay the video for a session instead of a physical recount.

In step 302, the input engine 202 receives the stream from the image capture device 104. The image capture device 104 may provide video or a stream at any speed. In some examples, the image capture device 104 provides a stream at 15 to 60 fps.

Figure 6:
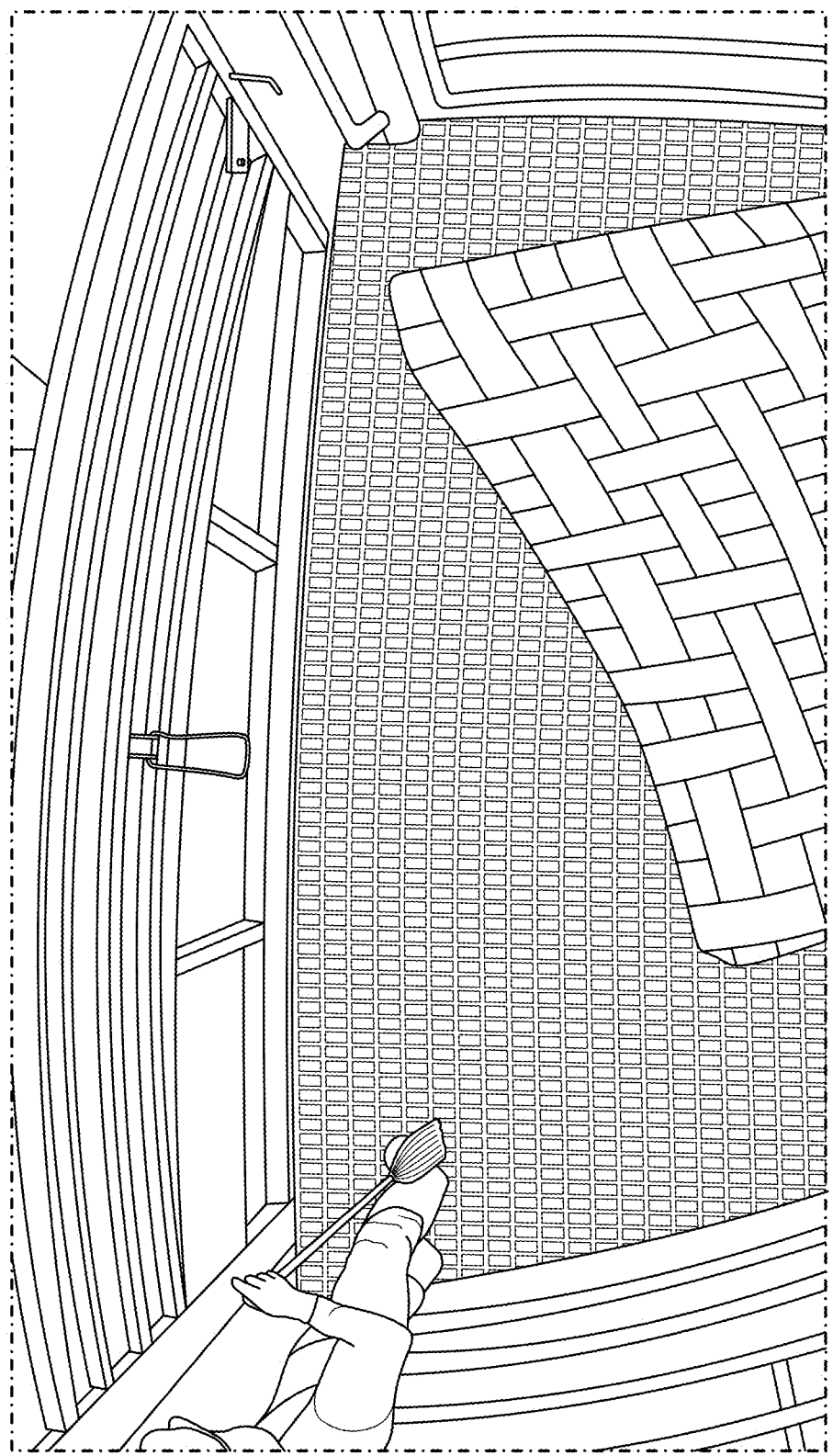
FIG. 6 depicts the view of an image capture device over a livestock path in some embodiments.

In one example, the image capture device 104 is positioned over a livestock path, such as a cattle chute or in front of a cattle gate. FIG. 6 depicts the view of an image capture device 104 over a livestock path in some embodiments. In FIG. 6, a gate is seen in the viewpoint of the image capture device. A worker may open the gate to initiate the livestock counting process. The swing open of the gate of a cattle chute, for instance, may satisfy a trigger condition to start the counting process. Similarly, in some embodiments, the closing of the gate may also satisfy a trigger condition to stop the counting process. In another example, the image processing engine 204 may detect a large animal such as a cow walking down the livestock path. The detection of a large animal livestock path may be an indication to begin the counting process.

It will be appreciated that any type of detectable event captured by image capture device 104 may be utilized to satisfy a trigger condition and begin the counting process. Similarly, any type of detectable event captured by the image capture device 104 may be utilized to satisfy a trigger condition and stop the counting process.

Figure 7A:
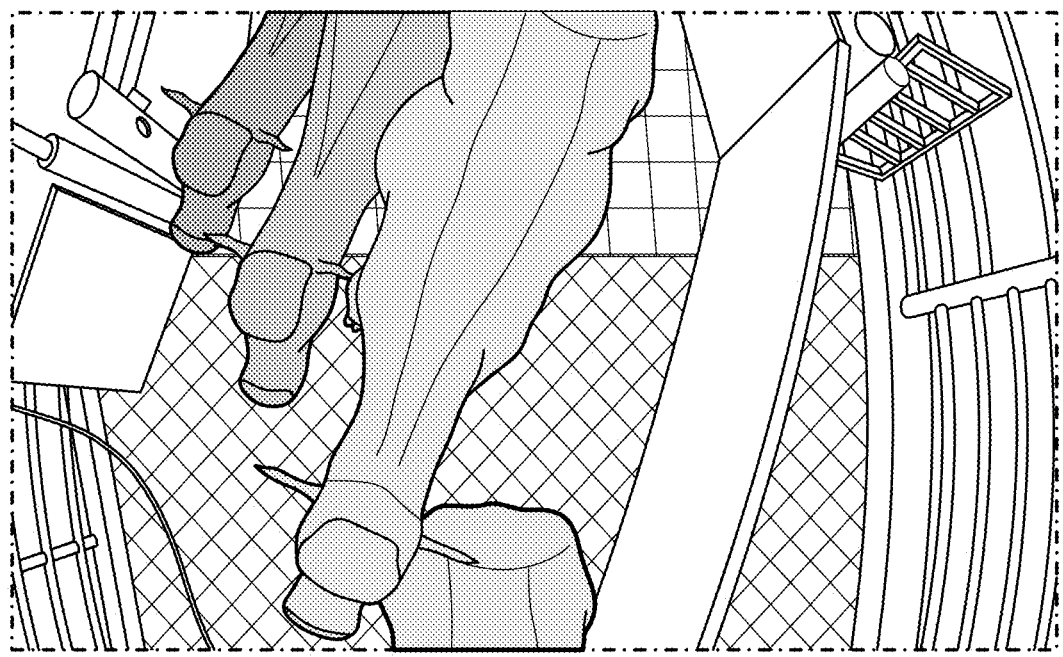
FIG. 7A depicts an image of cattle passing through a gate on the livestock path in some embodiments.
Figure 7B:
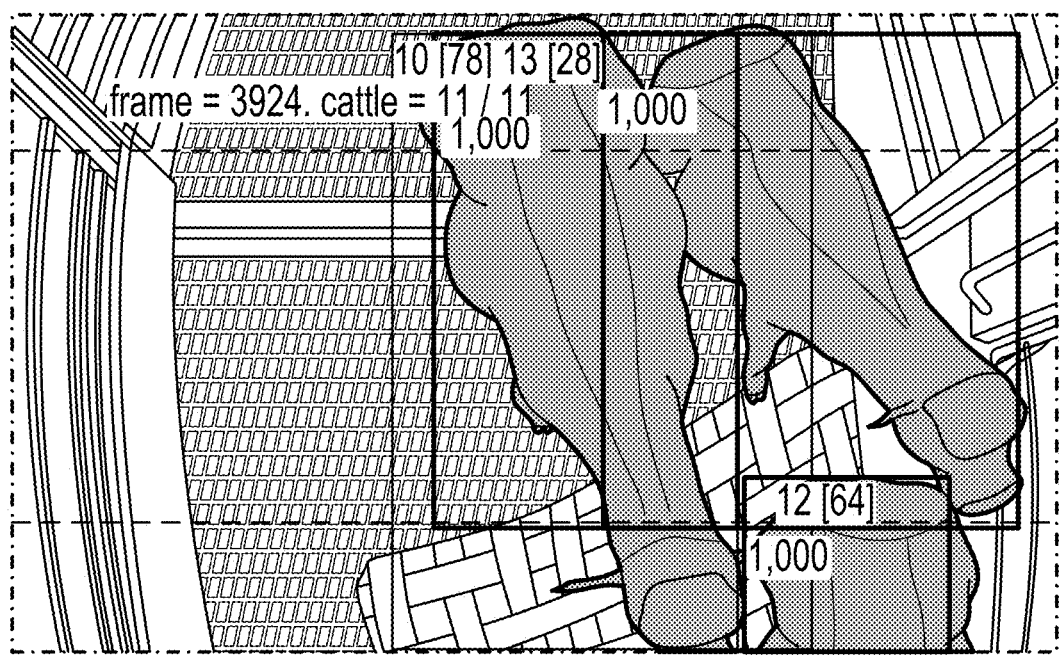
FIG. 7B depicts bounding boxes around regions of interest detected by the AI engine in one example.

FIG. 7A depicts an image of cattle passing through a gate on the livestock path in some embodiments.

The image processing engine 204 may apply a decoder to the stream of images received by the image capture device 104. In one example, the image processing engine 204 may utilize an FFMPEG decoder to decode the images and identify any number of images from the stream. In some embodiments, the image processing engine 204 may select an image periodically (e.g., selecting images at time intervals, based on interrupts, or based on the amount of video received).

Figure 9A:
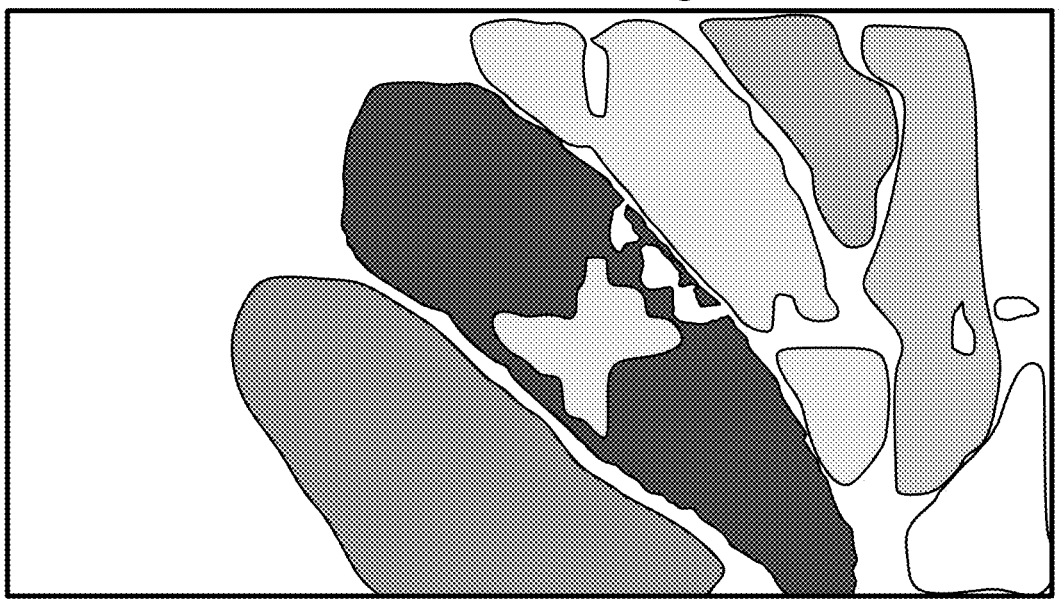
FIG. 9A depicts an image of cattle on a livestock path 108 that is encoded in grayscale in an example.
Figure 9B:
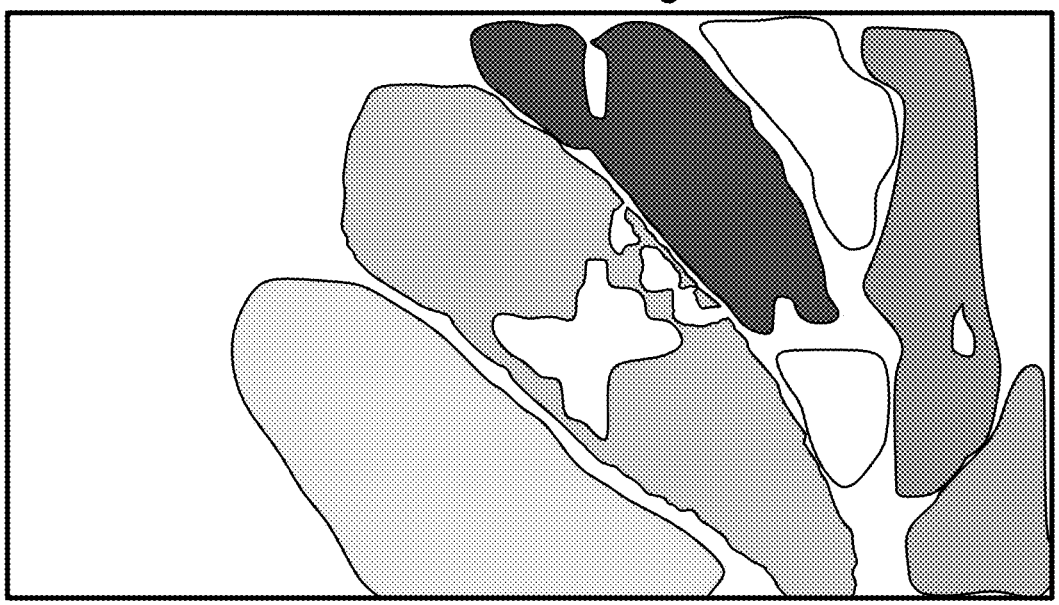
FIG. 9B depicts grayscale cattle after clustering whereby different animals are distinctly colored in an example.

In step 304, the AI engine 206 may process the images. In some embodiments, the AI engine 206 and/or the image processing engine 204 may transform any number of images to grayscale, where each grayscale value has a different identity. This optional process may be used to assist in discarding overlapping or occluded detections. FIG. 9A depicts an image of cattle on a livestock path 108 that is encoded in grayscale in an example. Images that show grayscale animals as being contiguous may be processed by the AI engine 206 and/or the image processing engine 204 to only include the largest cluster (or largest clusters relative to other detected clusters in the image) of connected pixel per detection. Clustering may assist in simplifying noisy raw detections. FIG. 9B depicts grayscale cattle after clustering whereby adjacent animals are distinctly colored in an example.

In step 306, the AI engine 206 may apply any number of models for segmentation mask creation. In various embodiments, the livestock tracking system 102 adds a branch for predicting segmentation masks on each region of interest (RoI) in parallel with the existing branch for classification and bounding box/non-rectangular, polygonal shape regression. FIG. 7B depicts bounding boxes around regions of interest (i.e., objects in the image) detected by the AI engine in one example.

The AI Engine 206 may apply a fully convolutional network (FCN) to each RoI of an image to predict a segmentation mask in a pixel to pixel manner. This process is different than Faster R-CNN which was not designed for pixel-to-pixel alignment between network inputs and outputs. For example, Faster R-CNN utilizes RoIPool as the core operation for attending to instances and performs coarse spatial quantization for feature extraction. To correct misalignment, the AI engine 206 applies a quantization-free layer that preserves spatial locations (i.e., RoIAlign discussed herein). This correction may significantly improve segmentation mask accuracy relative to Faster R-CNN.

In some embodiments, the AI engine 206 decouples segmentation mask and class prediction. The AI engine 206 may predict a binary segmentation mask for each class independently without competition among classes and rely on the network's RoI classification to predict the category. FCNs do not perform as well because they perform per-pixel multi-class categorization which couples segmentation and classification.

The AI engine 206 may process an image using a region proposal network (RPN) to propose candidate object bounding boxes by sliding a network over a convolutional feature map outputted from a previous convolutional layer. In various embodiments, the AI engine 206 utilizes non-rectangular, polygonal shapes rather than bounding boxes to improve accuracy. FIG. 7B depicts bounding boxes in one example. The main source of double counting is when there is an animal identity (e.g., ID 13) that is transferred to another animal. This error may be mitigated by switching from a bounding box based to a non-rectangular, polygonal-shape based tracker.

The AI engine 206 may extract features using RoIAlign from each candidate box (or candidate non-rectangular, polygonal shape) and performs classification and (bounding box or non-rectangular, polygonal shape) regression. In parallel to predicting the class and offset, the AI engine 206 outputs a binary segmentation mask for each RoI (this is in contrast to systems where classification depends on segmentation mask predictions).

Figure 8A:
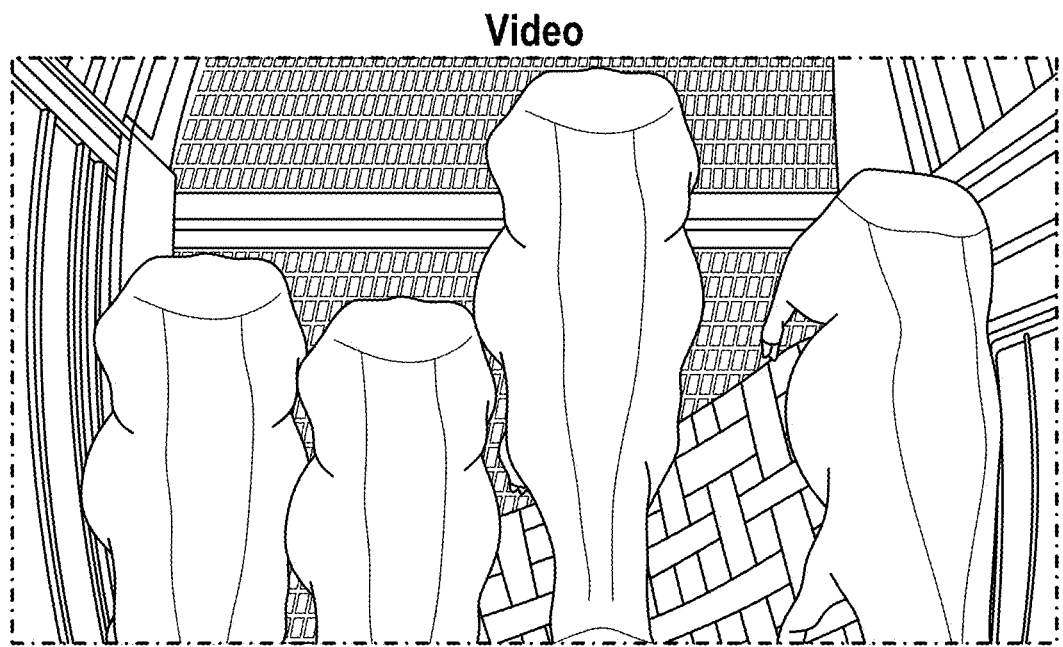
FIG. 8A depicts a digital image captured by the camera of multiple livestock travelling across the field of view of the camera in an example.
Figure 8B:
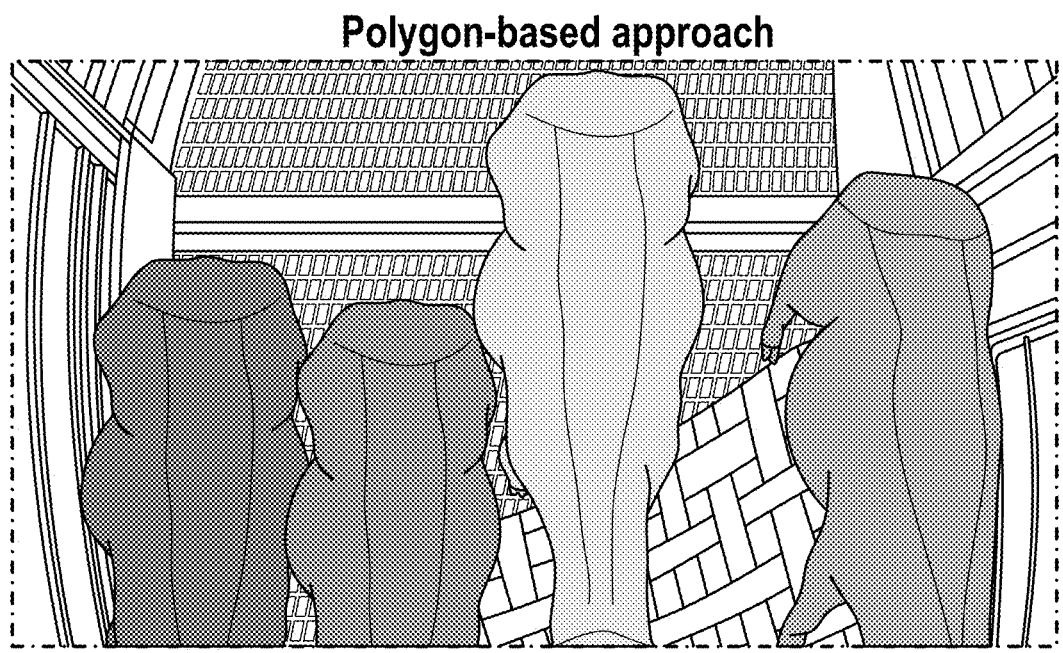
FIG. 8B depicts the livestock detected by coloring the animals travelling across the field of field of view of the camera using bounding non-rectangular, polygonal shapes in an example.

FIG. 8A depicts a digital image captured by the camera of multiple livestock travelling across the field of view of the camera in an example. FIG. 8B depicts the livestock detected by coloring the animals travelling across the field of field of view of the camera using bounding non-rectangular, polygonal shapes in an example.

During training, the training engine 212 may define a multi-task loss on each sampled RoI as we define a multi-task loss on each sampled RoI as $L=L_{cls}+L_{box}+L_{mask}$. The segmentation mask branch has a $Km^2$ dimensional output for each RoI. In some embodiments, the definition of the $L_{mask}$ may allow the training engine 212 to generate a segmentation mask for every class without competition among classes (e.g., this decouples the segmentation mask and class prediction common when applying FCNs).

A segmentation mask may encode an input objects spatial layout. As a result, extracting the spatial structure of segmentation masks may be addressed by pixel-to-pixel correspondence provided by convolutions.

The segmentation masks may be non-rectangular, polygonal boxes. The AI engine 206 may then apply models to identify the segmentation masks within the image as livestock.

In step 308, the classification engine 208 may review the segmentation masks and classify any number of the segmentation masks. Any number of the segmentation masks may be classified as containing an image of an animal for counting. The classification engine 208 may utilize one or more models to classify any number of segmentation masks. In various embodiments, the AI engine 206 performs the classification.

In steps 310 and 312, the livestock tracking system 102 may track images of the livestock as the animal moves across the livestock path 108. As discussed herein, the livestock tracking system 102 may receive multiple images of the livestock path 108 as the livestock travel from one end to the other. The livestock may enter in a registration zone and exit in a deregistration zone. The registration zone may be a portion of the livestock path (e.g., a region) where the animals enter and begin walking along the livestock path 108. The deregistration zone may be a portion of the livestock path (e.g., another region) where the animals exist the livestock path 108. As additional images are received by the livestock tracking system 102, the images may be decoded, processed, segmentation masks created, and animals categorize/identified. The segmentation masks may be compared between images to confirm previous categories and/or assess if multiple animals were previously contained within a single segmentation mask. If multiple animals appear in different images, the AI engine 206 may track and count the livestock.

In step 314, the AI engine 206 and/or the classification engine 208 may store the video, segmentation masks, and/or other information in the livestock datastore 216. In some embodiments, in step 316, the video, segmentation masks, and/or other information may be stored in local storage (e.g., storage that is local to the livestock tracking system 102). In various embodiments, all or part of the video, segmentation masks, and/or other information may be stored within cloud storage (e.g., within a storage system). In step 318, information (e.g., segmentation masks, counts, and the like) may be stored within logs of the livestock datastore 216. In step 320, video may be optionally stored in the livestock datastore 216 or in another storage (e.g., within the livestock tracking system 102, the control system, and/or the client system 112).

The client system 112 may retrieve or display the count for livestock in real time (e.g., during the count) or after a count is completed. For example, the livestock tracking system 102 may receive video and/or images from the image capture device 104 as the animals cross the livestock path 108. The livestock tracking system 102 may count the animals as they cross, enter, or leave the livestock path 108 (i.e., in real time). Similarly, the livestock tracking system 102 may provide the client system 112 with current counts that increase as the animals cross the livestock path 108. In some embodiments, the livestock tracking system 102 counts the animals in real time (i.e., as the animals cross the livestock path 108) but does not provide the subcount or total animal count until the counting is completed (e.g., the trigger condition indicates that counting is to stop).

The client system 112 may retrieve or display the information in any number of ways. In one example, in step 322, the client system 112 may utilize an application (e.g., an app) or browser to navigate to a local web page. The local web server may communicate with the web server in step 324 to retrieve the livestock count using an API configured to communicate with or through the API server in step 326 to retrieve video, information, and/or livestock count.

In various embodiments, the client system 112 may communicate with the livestock tracking system 102 over or using a webpage and Web server. For example, the web server may provide a webpage accessible to the client system 112. In some embodiments, the client system 112 may be required to register and/or log into the Web server, control system, or other device to access the webpage. Log information and or information retrieved from the datastores may be logged or otherwise tracked and stored in the user log database 214. The webpage may indicate a livestock count. In various embodiments, the client system 112 communicates with the web server to access the webpage using a VPN or other encrypted communication methodology. In some embodiments, the webpage may include a video replay of the livestock the passes over the livestock path. The web page may also include a pre-count and/or manual count entry to assist in validating overall counting accuracy of livestock.

The client system 112 may communicate with a web page or other interface that displays a video replay option to review stored video (e.g., in the livestock datastore 216) used for livestock counting. The interface may also display counting as the livestock move across the livestock path 108 in the video. In some embodiments, the interface may display a date, location, and count of livestock that was counted by the livestock tracking system 102 at the date and location. In some embodiments, previous counts (e.g., counts of animals as they were loaded on a truck or before any time before they walked across the livestock paths) may be displayed along with the count of the tracking system 102.

Figure 4:
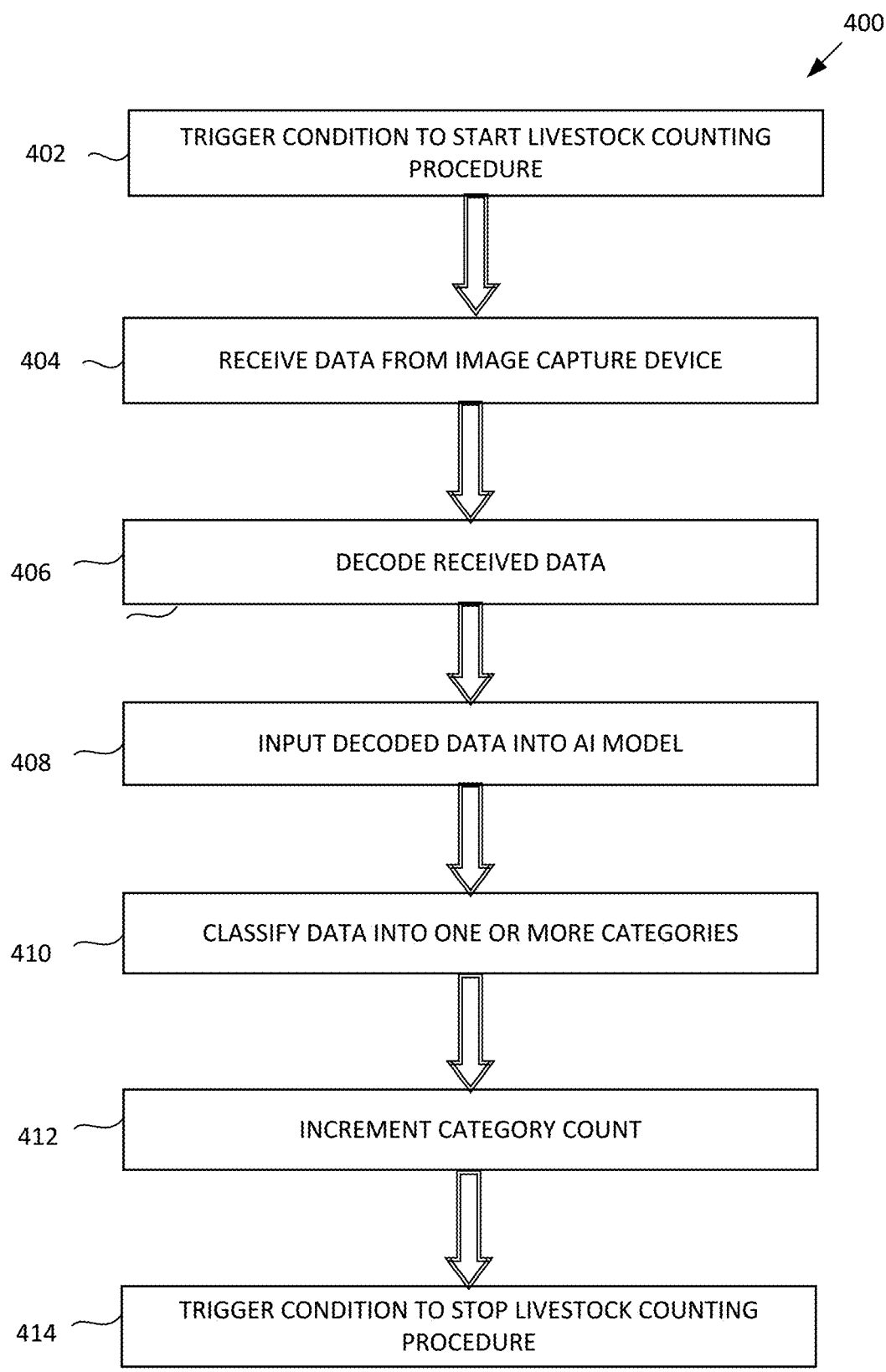
FIG. 4 is a flowchart for tracking and counting livestock in some embodiments.

FIG. 4 is a flowchart for tracking and counting livestock in some embodiments. In this example, the livestock incudes only pigs. In step 402, a trigger condition is satisfied to start livestock counting. In one example, the livestock tracking system 102 may receive a manual trigger, such as a command or physical switch, to begin the livestock counting process.

In other embodiments, the image processing engine 204 may identify an event within an image as satisfying a trigger condition. For example, the image capture device 104 may provide a stream of images or video to the livestock tracking system 102, even if the livestock tracking system 102 has not yet engaged in the process of counting animals. The input engine 202 may receive the stream and utilize a decoder to decode the images from the stream. The input engine 202 may also select any number of images for processing. Image processing engine 204 may access our exam of the images to detect an event that may trigger the counting process.

Once the counting process has begun, the input engine 202 receives video from the image capture device 104. In step 406, the image processing engine 204 or the input engine 202 may decode the received data and select images to be processed by the image processing engine 204.

In step 408, the AI engine 206 receives the decoded data and applies any number of models for candidate region proposal selection, object classification, tightening of the non-rectangular, polygonal shape(s), object identification, and counting. The image processing engine 204 may utilize Mask R-CNN (a U-Net approach) for instance segmentation and identifying livestock for counting.

Figure 11:
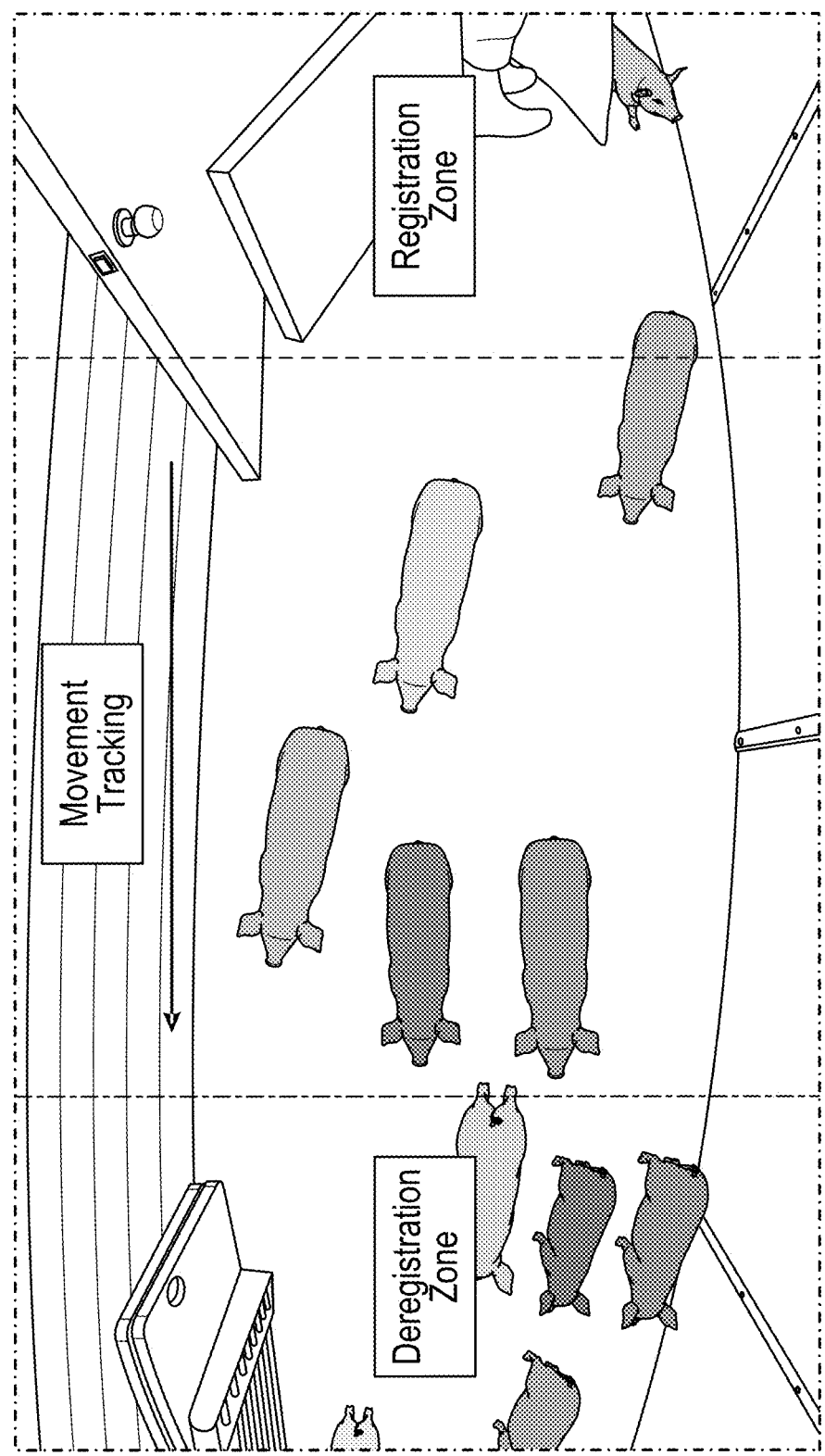
FIG. 11 is an example livestock tracking system 102 used for counting pigs in some embodiments.

FIG. 11 is an example livestock tracking system 102 used for counting pigs in some embodiments. In this example, the pigs travel along a livestock path 108. In FIG. 11, the field of view of an image capture device 104 may be divided into three sections including a registration zone, movement tracking zone, and deregistration zone. Pigs typically will travel from the registration zone through the movement tracking zone and out through the deregistration zone.

In various embodiments, the livestock tracking system 102 may utilize these regions in any number of ways. In some embodiments, the livestock tracking system 102 receives images from each different zone and identifies the animals in each zone. The livestock tracking system 102 may identify and count the animals in the registration zone as well as identify and count the animals in the deregistration zone. If the same animals are identified and counted in the different zones, the counts should be the same. If the counts are different, the livestock tracking system 102 may assess or re-assess the images (and/or additional images in the movement tracking zone) to evaluate the decision-making that identified the animals. For example, if two animals were close together in the registration zone, the livestock tracking system 102 may have counted the animals as a single animal. As the animals move across the movement tracking zone into the deregistration zone, the animals may have separated. By assessing or reviewing images from the movement tracking zone into the deregistration zone, the livestock tracking system 102 may track the animals, identify the error, log the process, and update the count.

Similarly, if two animals were close together in the deregistration zone, the livestock tracking system 102 may have counted the animals as a single animal. As the animals move across the movement tracking zone into the deregistration zone, the animals may have started to move more closely together. By assessing or reviewing images from the registration zone, through the movement tracking zone into the deregistration zone, the livestock tracking system 102 may track the animals, identify the error, log the process, and update the count.

The livestock tracking system 102 may utilize registration zones and deregistration zones as well as frame skip allowances to tune performance.

It will be appreciated that this process may be utilized with any animals (not just pigs) or combination of animals.

Figure 12A:
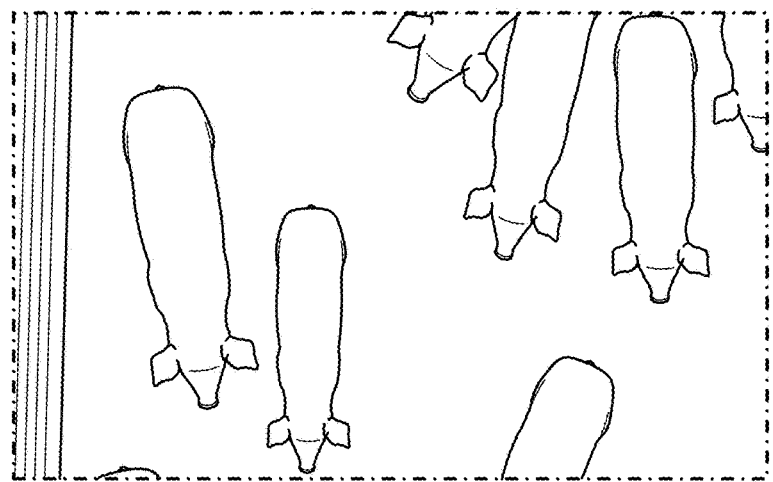
FIG. 12A depicts an image received by the livestock tracking system 102 in an example.
Figure 12B:
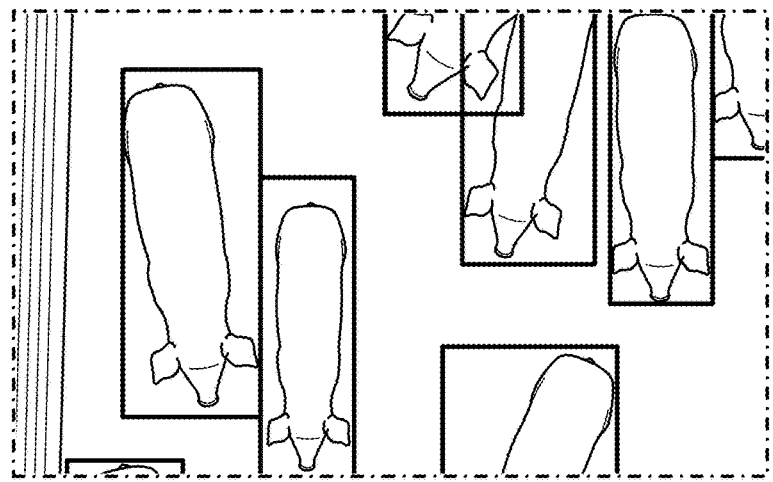
FIG. 12B depicts each pig within a bounding box in an example.
Figure 12C:
FIG. 12C depicts each pig within a non-rectangular, polygonal shape in an example.

In various embodiments, bounding boxes or non-rectangular, polygon shapes are used to create regions for selection and/or classification. FIGS. 12A-C depict pigs cross over the livestock path 108. FIG. 12A depicts an image received by the livestock tracking system 102 in an example. FIG. 12B depicts each pig within a bounding box in an example. FIG. 12C depicts each pig within a non-rectangular, polygonal shape in an example. Bounding boxes provide the advantages of providing a faster inference and faster labels. However, detection and tracking are more difficult, particularly if the animals are close together. Non-rectangular, polygonal shapes may provide for slower inference and labeling when compared with bounding boxes, however, they provide for more accurate detection and tracking.

When tracking with bounding boxes, the AI engine 206 may apply deepsort. For example, the AI engine 206 may apply a simple online and real time tracking with a deep association metric. This may work well at low frame rates and incorporates visual distinctions and motion information. Unfortunately, overlapped bounding boxes may confuse the model.

When tracking with non-rectangular, polygonal shapes, tracking may be performed by intersection-over union (IoU). IoU is determined by dividing the areas of overlap by the area of union of non-rectangular, polygonal shapes. This process can be very accurate at high frame rates. Visual distinction, however, may be lost and may not be as useful on low frame rates.

In various embodiments, polygonal shapes with IoU provided for an increase of accuracy in animal identification and counting over bounding boxes with deep sort.

In various embodiments, when non-rectangular, polygonal shapes are used rather than bounding boxes, the AI engine 206 may utilize a mask criteria to assist in the selection of RoI. For example, the non-rectangular, polygonal shapes may be required to be of a sufficient size and/or shape to approximate the animal to be counted (e.g., pigs) and/or approximate pigs of an expected age range.

As discussed herein, the AI engine 206 may utilize Mask R-CNN for instance segmentation. The AI engine 206 may utilize a full CNN on the top of CNN features from an image generate a mask segmentation output. The AI engine 206 may add a branch to output a binary mask that says whether a pixel is part of an object that runs in parallel to the region proposal network. The AI engine 206 may utilize the Region Proposal Network by passing a sliding window over the CNN feature map and outputting K potential non-rectangular, polygonal shapes (e.g. as opposed to bounding boxes). The AI engine 206 may score each non-rectangular, polygonal shape, utilizing a cls layer for scores and reg layer for coordinates. For each anchor shape (e.g., anchor box or anchor non-rectangular, polygonal shape), the AI engine 206 may output a score for position in the image.

The AI engine 206 pass each selected non-rectangular, polygonal shape (e.g., expected to be an image) through FAST CNN for classification and tightening. As discussed herein, rather than RoI pool, RoIAlign may perform a forward pass of the image.

In step 410, the classification engine 208 may classify data into one or more categories. When performing a count of a single type of animal (e.g., pigs or cows), classification is simplified because of the lack of variety. In some embodiments, any number of SVMs may classify if a selected non-rectangular, polygonal shape is an object, and if so, categorize and/or label the object (e.g., identify the pig).

In step 412, the tracking engine 210 may track pigs across the field of view (e.g., across the zones) and/or may count the animals. For example, the tracking engine 210 may increment a count as they pass through the registration zone or a livestock path 108 exit (opposite of the entrance of the livestock). If an animal travels in the other direction, the tracking engine 210 may decrement the count. In this example, if the animal ultimately turns around and travels back across the livestock path 108 to the exit, the tracking engine 210 may increment the count.

In some embodiments, the tracking engine 210 does not increment a count until the animal enters or leaves the deregistration zone away from the livestock path 108.

In step 414, a trigger condition is satisfied to stop livestock counting. In one example, the livestock tracking system 102 may receive a manual trigger, such as a command or physical switch, to stop the livestock counting process. In some embodiments, the trigger condition may be a detection of a gate being closed, identification within an image of a closed gate, identification within an image of a sign held or positioned in the livestock path 108, or the like.

While the livestock tracking system 102 and FIG. 1 is depicted as being in communication with only the client system 112 and the image capture device 104, it will be appreciated that the livestock tracking system 102 may, in some embodiments, be in communication with a livestock counting server for control system via the communication network. For example, a livestock control system may provide updates or extend functionality of any number of livestock tracking systems for any number of different customers. In some embodiments, the livestock tracking system 102 that is proximate to an image capture device 104 may provide services to a local client system 112. Alternately, the livestock tracking system 102 that is proximate to image capture device 104 may provide services to any number of remote client systems 112.

In some embodiments, a livestock tracking system 102 may work with a livestock control system to perform image processing and/or model analysis. For example, the livestock tracking system 102 may provide processed images or decoded video to the livestock control system on a network. The livestock control system may utilize cloud-based resources to perform analysis, perform training, perform instant segmentation, and/or the like. In other embodiments, the livestock control system may update models and/or image processing analytics to any number of livestock tracking system 102 over any number of communication networks.

FIG. 13 is a block diagram illustrating entities of an example machine able to read instructions from a machine-readable medium and execute those instructions in a processor to perform the machine processing tasks discussed herein, such as the engine operations discussed above. Specifically, FIG. 13 shows a diagrammatic representation of a machine in the example form of a computer system 1300 within which instructions 1324 (e.g., software) for causing the machine to perform any one or more of the methodologies discussed herein may be executed. In alternative embodiments, the machine operates as a standalone device or may be connected (e.g., networked) to other machines, for instance, via the Internet. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1324 (sequential or otherwise) that specify actions to be taken by that machine. Further, while only a single machine is illustrated, the term "machine" shall also be taken to include any collection of machines that individually or jointly execute instructions 1324 to perform any one or more of the methodologies discussed herein.

The example computer system 1300 includes a processor 1302 (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 1304, and a static memory 1306, which are configured to communicate with each other via a bus 1308. The computer system 1300 may further include a graphics display unit 1310 (e.g., a plasma display panel (PDP), a liquid crystal display (LCD), a projector, or a cathode ray tube (CRT)). The computer system 1300 may also include alphanumeric input device 1312 (e.g., a keyboard), a cursor control device 1314 (e.g., a mouse, a trackball, a joystick, a motion sensor, or other pointing instrument), a data store 1316, a signal generation device 1318 (e.g., a speaker), an audio input device 1326 (e.g., a microphone) and a network interface device 1320, which also are configured to communicate via the bus 1308.

The data store 1316 includes a machine-readable medium 1322 on which is stored instructions 1324 (e.g., software) embodying any one or more of the methodologies or functions described herein. The instructions 1324 (e.g., software) may also reside, completely or at least partially, within the main memory 1304 or within the processor 1302 (e.g., within a processor's cache memory) during execution thereof by the computer system 1300, the main memory 1304 and the processor 1302 also constituting machine-readable media. The instructions 1324 (e.g., software) may be transmitted or received over a network (not shown) via network interface 1320.

While machine-readable medium 1322 is shown in an example embodiment to be a single medium, the term "machine-readable medium" should be taken to include a single medium or multiple media (e.g., a centralized or distributed database, or associated caches and servers) able to store instructions (e.g., instructions 1324). The term "machine-readable medium" shall also be taken to include any medium that is capable of storing instructions (e.g., instructions 1324) for execution by the machine and that cause the machine to perform any one or more of the methodologies disclosed herein. The term "machine-readable medium" includes, but should not be limited to, data repositories in the form of solid-state memories, optical media, and magnetic media.

In this description, the term "engine" refers to computational logic for providing the specified functionality. An engine can be implemented in hardware, firmware, and/or software. Where the engines described herein are implemented as software, the engine can be implemented as a standalone program, but can also be implemented through other means, for example as part of a larger program, as any number of separate programs, or as one or more statically or dynamically linked libraries. It will be understood that the named engines described herein represent one embodiment, and other embodiments may include other engines. In addition, other embodiments may lack engines described herein and/or distribute the described functionality among the engines in a different manner. Additionally, the functionalities attributed to more than one engine can be incorporated into a single engine. In an embodiment where the engines as implemented by software, they are stored on a computer readable persistent storage device (e.g., hard disk), loaded into the memory, and executed by one or more processors as described above in connection with FIG. 13. Alternatively, hardware or software engines may be stored elsewhere within a computing system.

As referenced herein, a computer or computing system includes hardware elements used for the operations described here regardless of specific reference in FIG. 13 to such elements, including, for example, one or more processors, high-speed memory, hard disk storage and backup, network interfaces and protocols, input devices for data entry, and output devices for display, printing, or other presentations of data. Numerous variations from the system architecture specified herein are possible. The entities of such systems and their respective functionalities can be combined or redistributed.

The invention claimed is:

1. A system comprising:
at least one processor; and
memory, the memory containing instructions to control any number of the at least one processor to:
receive video from an image capture device, the image capture device being positioned over a livestock path, the video containing images of livestock walking along the livestock path, the image capture device including any number of cameras;
select an image from the video;
generate feature maps from the image by applying at least a first convolutional neural network;
slide a first window across the feature maps to obtain a plurality of anchor shapes using a region proposal network;
determine if each anchor shape of the plurality of anchor shapes contains an object to generate a plurality of regions of interest, each of the plurality of regions of interest being a non-rectangular, polygonal shape;
extract feature maps from each region of interest;
classify objects in each region of interest;
in parallel with the object classification, predict segmentation masks on at least a subset of the plurality of regions of interest in a pixel-to-pixel manner;
identify individual animals within the objects based on the classifications and the segmentation masks;
count individual animals based on the identification; and
provide the count to a digital device for display.

2. The system of claim 1, wherein extracting the feature maps from the regions of interest comprises performing RoIAlign to extract the feature maps from each region of interest, ROIAlign utilizing binary interpolation to preserve spatial information which would otherwise get misaligned if ROI pool was applied.

3. The system of claim 1, wherein each anchor shape is a non-rectangular, polygonal shape.

4. The system of claim 1, wherein classification does not depend upon segmentation masks.

5. The system of claim 1, wherein each segmentation mask encodes an associated object's spatial layout.

6. The system of claim 1, wherein the image capture device comprises a LiDAR device.

7. The system of claim 6, wherein the feature maps are generated from image information of the image and depth information from the LiDAR device.

8. The system of claim 1, wherein the system receives multiple images of a herd of the livestock as the herd of the livestock travels the livestock path, the memory containing instructions to count at least a subset of the animals of the herd using the multiple images and generate a total of the counted animals.

9. The system of claim 8, wherein the memory containing instructions to provide the count to the digital device for displays comprises the memory containing instructions to provide the total of the counted animals.

10. The system of claim 1, wherein counting occurs in real time as the livestock walks along the livestock path.

11. A non-transitory computer readable medium comprising instructions to a control at least one processor to perform a method, the method comprising:
receiving video from an image capture device, the image capture device being positioned over a livestock path, the video containing images of livestock walking along the livestock path, the image capture device including any number of cameras;
selecting an image from the video;
generating feature maps from the image by applying at least a first convolutional neural network;
sliding a first window across the feature maps to obtain a plurality of anchor shapes using a region proposal network;
determining if each anchor shape of the plurality of anchor shapes contains an object to generate a plurality of regions of interest, each of the plurality of regions of interest being a non-rectangular, polygonal shape;
extracting feature maps from each region of interest;
classifying objects in each region of interest;
in parallel with the object classification, predicting segmentation masks on at least a subset of the plurality of regions of interest in a pixel-to-pixel manner;
identifying individual animals within the objects based on the classifications and the segmentation masks;
counting individual animals based on the identification; and
providing the count to a digital device for display.

12. The non-transitory computer readable medium of claim 11, wherein extracting the feature maps from the regions of interest comprises performing RoIAlign to extract the feature maps from each region of interest, ROIAlign utilizing binary interpolation to preserve spatial information which would otherwise get misaligned if ROI pool was applied.

13. The non-transitory computer readable medium of claim 11, wherein each anchor shape is a non-rectangular, polygonal shape.

14. The non-transitory computer readable medium of claim 11, wherein classification does not depend upon segmentation masks.

15. The non-transitory computer readable medium of claim 11, wherein each segmentation mask encodes an associated object's spatial layout.

16. The non-transitory computer readable medium of claim 11, wherein the image capture device comprises a LiDAR device.

17. The non-transitory computer readable medium of claim 16, wherein the feature maps are generated from image information of the image and depth information from the LiDAR device.

18. The non-transitory computer readable medium of claim 11, comprising receiving multiple images of a herd of the livestock as the herd of the livestock travels the livestock path and counting at least a subset of the animals of the herd using the multiple images and generate a total of the counted animals.

19. The non-transitory computer readable medium of claim 18, wherein providing the count to the digital device for displays comprises providing the total of the counted animals.

20. The non-transitory computer readable medium of claim 11, wherein counting occurs in real time as the livestock walks along the livestock path.

21. A method comprising:
receiving video from an image capture device, the image capture device being positioned over a livestock path, the video containing images of livestock walking along the livestock path, the image capture device including any number of cameras;
selecting an image from the video;
generating feature maps from the image by applying at least a first convolutional neural network;
sliding a first window across the feature maps to obtain a plurality of anchor shapes using a region proposal network;
determining if each anchor shape of the plurality of anchor shapes contains an object to generate a plurality of regions of interest, each of the plurality of regions of interest being a non-rectangular, polygonal shape;
extracting feature maps from each region of interest;
classifying objects in each region of interest; in parallel with the object classification, predicting segmentation masks on at least a subset of the plurality of regions of interest in a pixel-to-pixel manner;
identifying individual animals within the objects based on the classifications and the segmentation masks;
counting individual animals based on the identification; and
providing the count to a digital device for display.

* * * * *